Patented July 3, 1945

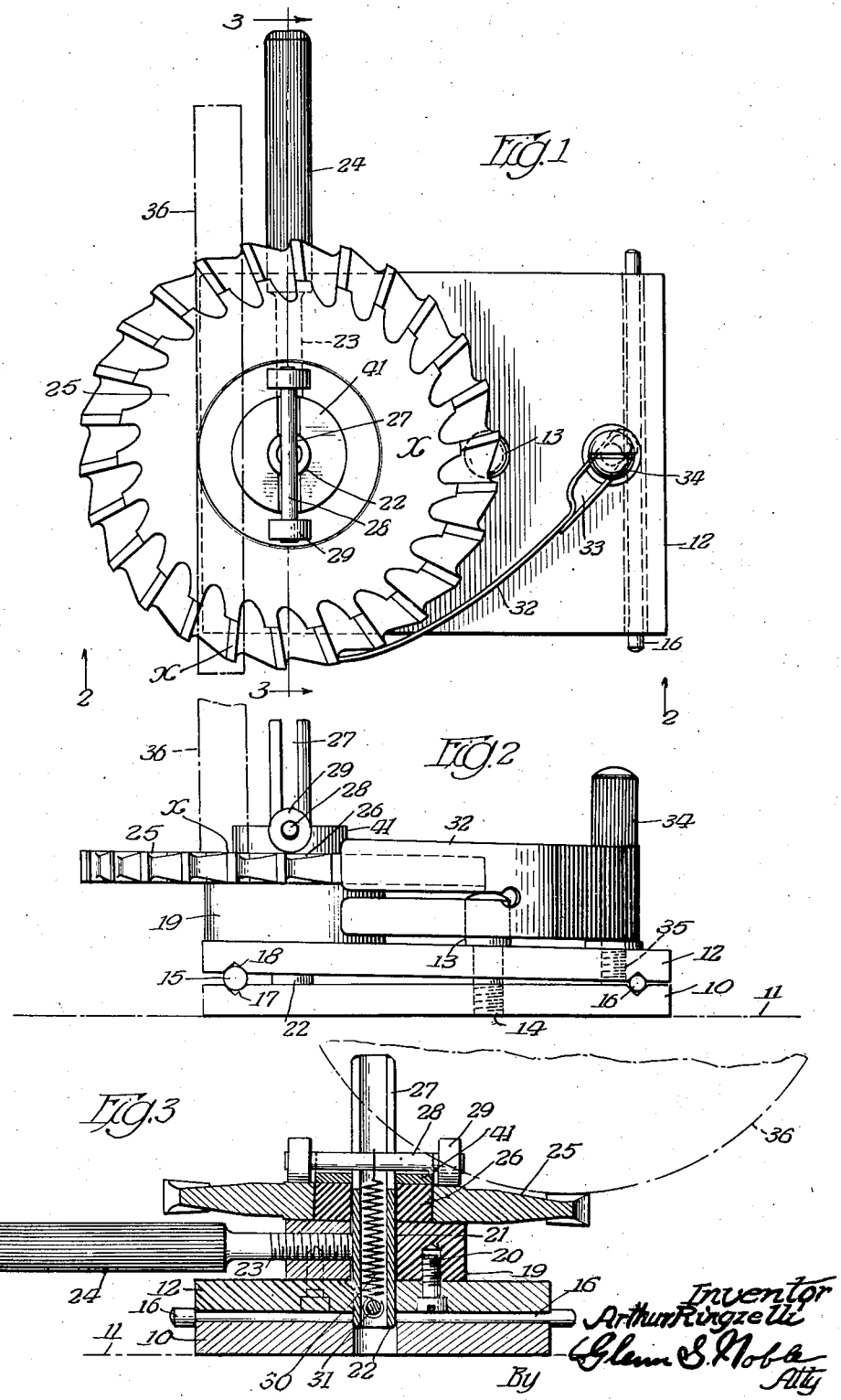

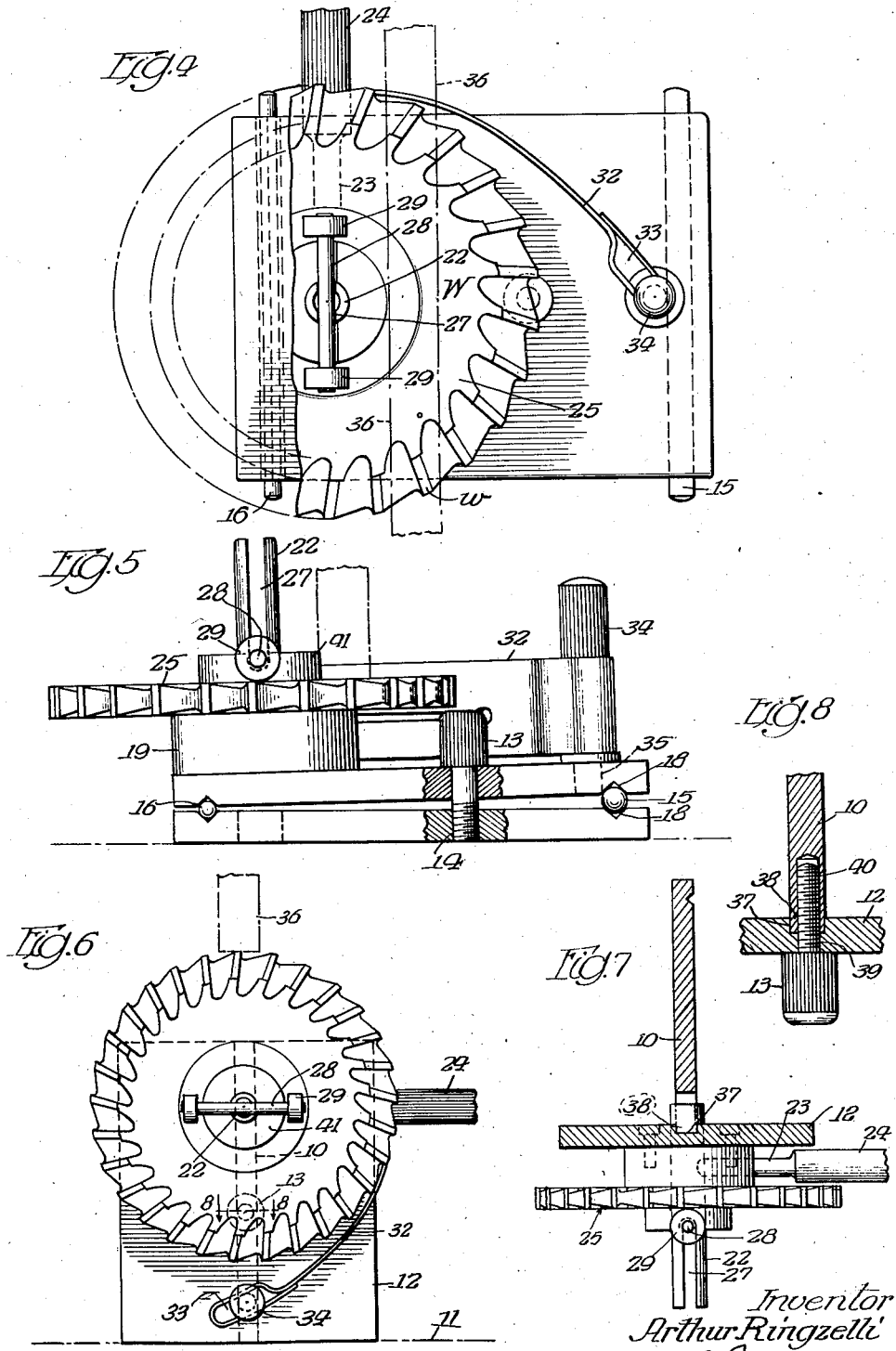

2,379,594

UNITED STATES PATENT OFFICE 2,379,594

GRINDING FIXTURE FOR CUTTERS

Arthur Ringzelli, Chicago, Ill.

Application January 29, 1943, Serial No. 473,945

5 Claims. (Cl. 51—225)

This invention comprises a holder or fixture for holding various forms of cutters and is particularly useful for holding side milling cutters while being ground, although not limited for use with this particular form of cutter.

The objects of the present invention are to provide an improved fixture whereby milling machine cutters, or the like, may be readily ground on a surface grinder with the necessary degree of accuracy even by an inexperienced person; to provide means whereby a tool such as a milling machine cutter, or the like, may be mounted on a surface grinder and held in proper relation to the grinding wheel to insure accurate grinding of the teeth with the necessary or desired clearance for the sides and faces of the same; to provide a grinding jig or fixture for cutters having means for readily varying or changing the angle of the side of the tooth with respect to the grinding wheel to permit variation in the clearances; to provide means whereby the cutter to be sharpened may be rotated in a step by step manner and held in adjusted positions for grinding the several teeth; to provide a holder or fixture of the kind indicated whereby the milling cutter may be readily reversed or held with one side up and then the other side up to permit proper grinding of both sides of the teeth; to provide a fixture for grinding both sides of the teeth of a milling cutter and also for grinding the outer or circumferential edges; and to provide such other advantages and novel features as will be described hereinafter.

In the accompanying drawings illustrating this invention,

Fig. 1 is a plan view of the fixture with a circular cutter mounted thereon and showing the position of the grinding wheel;

Fig. 2 is a front view of the fixture shown as mounted on a surface grinder and taken approximately on the line 2—2 of Fig. 1;

Fig. 3 is a sectional view taken approximately on the line 3—3 of Fig. 1;

Fig. 4 is a plan view of the fixture showing the cutter after it has been turned over for grinding the opposite faces of the teeth;

Fig. 5 is a side view of the parts as shown in Fig. 4;

Fig. 6 is a front view of the fixture with parts thereof reassembled to hold the cutter vertically for grinding the outer edges or tops of the teeth to provide proper clearance or relief;

Fig. 7 is a plan view partly in section of the fixture as shown in Fig. 6; and

Fig. 8 is a detail taken on the line 8—8 of Fig. 6.

In the particular form of the invention as shown in these drawings, 10 is a fixed base or plate which is adapted to be mounted on the reciprocating bed 11 of a surface grinding machine and held by magnetism in a well kown manner. A second plate or base member 12 which is preferably coextensive with the base 10 is mounted on the base and fastened in position by a screw 13 which engages with a threaded hole 14 in the base. Adjustment or variation of the pitch of the plate 12 is provided by means of short rods or pins 15 and 16 which engage with oppositely disposed parallel grooves 17 and 18 in the base and plate respectively. The surfaces of the bed 10 and plate 12 are all parallel so that by having one of the pins or rods larger than the other, any desired pitch or slant may be given to the top plate. Also by changing the pins, the top plate may be pitched in either direction.

A hub or turret 19 is fixed to the plate 12 in any convenient manner as by means of screws 20. The upper surface of this hub has a fixed angle or slopes downwardly toward the front as shown in Fig. 3 in order to provide for the desired clearance when grinding the sides of the teeth as will presently be explained. The hub has a central bore 21 which also extends down through the plate 12 and base 10. A hollow pin 22 engages with the hole 21 and moves freely therein. This pin may be fastened in any adjusted position by means of a set screw 23 having a rearwardly extending handle or knurled portion 24 for convenience in operating the same. The cutter 25 which is to be ground is mounted on the pin 22 and washers 26 are provided of different sizes and thicknesses to coact with different sized cutters and center holes which may vary to a considerable degree. The upper end of the pin 22 has a slot 27 for receiving a transverse shaft 28 which fits therein and is provided at its ends with wheels or rollers 29. The shaft is drawn or urged downwardly by a tension spring 30, one end of which is secured to the shaft and the other end to a cross pin 31 in the hollow pin 22. The pin 22 is also provided with a spacing washer 41 having a transverse slot for the shaft 28 as shown. When the parts are assembled as shown in Fig. 3, and the pin 22 pressed downwardly, it will cause the rollers 29 to engage with the hub of the cutter and the set screw 23 is tightened to hold the parts in operative position while permitting the cutter to be rotated on the pin.

The cutter is held in adjusted position by means of a spring finger or detent 32 which has an elongated eye or loop 33 which is engaged by a set screw 34 for holding it in adjusted position. The set screw engages with a threaded hole 35 in the plate 12 and when it is loosened, the loop 33 may be slid along the screw in order to adjust the position of the end of the detent.

When the sides of the teeth on one side of the cutter, as for instance, the side marked "X" in Fig. 1 are to be ground, the cutter is mounted as shown in Figs. 1 to 3 and the fitting is positioned on the bed of the grinder so that one tooth, as for instance, the tooth marked "x" is in position to be engaged by the grinding wheel 36, and as the fixture moves back and forth under the wheel, this tooth will be ground or sharpened with the desired clearances.

The elevation of the plate 12 at the left hand side causes the tooth to be held in suitable position to give the desired back-off angle or clearance circumferentially on the side being ground. This angle may be varied by replacing the pins 15 and 16 with pins of different sizes to secure any desired taper or back-off. The clearance radially is provided by the pitch or bevel of the hub 19 which holds the cutter at a slight angle to the horizontal and therefore permits the tooth to be presented to the grinding wheel at the proper angle for securing clearance in this respect. When one tooth has been ground, the cutter is rotated like a ratchet until the next tooth passes the end of the detent 32 when the detent will snap into position on the next tooth to hold the wheel in the new position. This operation is repeated until all of the teeth have been sharpened. The carriage is only reciprocated a relatively small amount or so that the teeth which are being sharpened pass back and forth under the lower portion of the grinding wheel. If it is desired to adjust the wheel circumferentially or to change the position of the tooth with respect to the grinding wheel, the detent 32 may be moved longitudinally to hold the tooth in such desired position.

When the teeth on the other side of the cutter as marked "W" in Fig. 4 are to be sharpened, the cutter is turned over on the fixture and the parts are adjusted as shown in Figs. 4 and 5 with the larger pin 15 at the right and the smaller pin 16 at the left as shown in Fig. 5 and the detent 32 positioned to engage the cutter at the back of the fixture so that it will coact with the teeth in a ratchet-like manner as above described. With the parts positioned in this manner, the grinding wheel 36 is caused to engage with a single tooth w at the right of the pivot, or as shown, and the grinding operation is carried on in the above described manner.

The various elements of the jig or fixture are rearranged as shown in Figs. 6 to 8 in order to support the cutter in a vertical plane for grinding the tops or circumferential portions of the teeth. The device is shown on a reduced scale in these figures. The plate 12 is provided with a transverse groove 37 in the lower face thereof which is adapted to receive one edge 38 of the base 10 which fits closely therein. The set screw 13 which has been removed from these parts, passes through a hole 39 in the plate 12 and engages with the threaded hole 40 in the edge of the base 10 as shown in Fig. 8. This locks the base 10 and plate 12 together to form a T-shaped support with the lower edges engaging with the bed of the grinder. The various coacting parts are assembled as shown in these figures and the cutter is adjusted to bring the top of one of the teeth in position to be engaged by the grinding wheel 36 as shown in Fig. 6. With the cutter securely held in this manner, it may be moved back and forth under the grinding wheel until the tooth is sharpened. Then by ratcheting the cutter around one tooth at a time, all of the teeth are brought into position for successive sharpening. With this set up, the clearance for relief may be varied by adjusting the detent 32 longitudinally which will tend to hold the uppermost tooth toward or away from the vertical, thus varying the angle between the outer edge of the tooth and the grinding wheel to any desired amount.

From this description, it will be seen that I provide a simple and substantial fixture which may be utilized for grinding various kinds of cutters, milling cutters, or other similar devices which may be modified for different specific forms of cutters without departing from the scope of the invention.

Having thus described my invention, what I claim is:

1. In a fixture for supporting a cutter to be ground on a grinder, the combination of a substantially rectangular metallic base plate, a second plate positioned above the base plate, means adjustably holding said plates together, pairs of oppositely disposed parallel grooves adjacent to the ends of the plates, a plurality of detachable cylindrical rods for engagement with said grooves for fixing the slope of the second plate with respect to the base plate, means for rotatably mounting a cutter to be ground on the second named plate, and means for holding the cutter in adjusted positions.

2. A grinding fixture for milling machine cutters, including a base, a hub projecting upwardly from the base and having its top surface at an angle to the base, a hollow pin engaging with a hole in the hub and base and slidably mounted therein, and serving to support the cutter on the hub, a set screw in the hub for holding the hollow pin in adjusted positions, a shaft extending through a slot in the upper portion of the pin, spring means tending to urge the shaft downwardly, rollers on the ends of the shaft adapted to engage with the hub of the cutter which is to be ground, and a detent secured to the base and adapted to engage with the teeth of the cutter to hold the cutter in adjusted positions as it is rotated to bring the respective teeth into grinding position.

3. A holder for holding cutters in grinding position on a surface grinding machine, comprising a base plate adapted to be mounted on the bed of the grinding machine, a second plate substantially coextensive with the first named plate positioned above the same, a set screw for adjustably securing said plates together, pairs of substantially parallel oppositely disposed grooves in said plates on either side of the set screw, pins of various diameters adapted to engage with said pairs of grooves to fix the pitch of the top plate with respect to the lower plate, a hub extending upwardly from the top plate and having a central bore which extends down through the plates, a hollow pin slidably mounted in the bore, a set screw in the hub engaging with the pin, a washer fitting over the pin and resting on the hub, said washer and pin serving to support the cutter on the hub, and means coacting with the pin for holding the cutter resiliently against the hub.

4. A holder for holding cutters to be ground on a surface grinder or the like, comprising a plate having a transverse groove in one face thereof, a second plate having one edge fitting in said groove and projecting at a right angle to the first plate, means for detachably securing the plates together, said plates being of substantially the same height and together forming a T-shaped support adapted to engage with the face plate of the grinder, means on the first named plate for rotatably supporting the cutter in a vertical position, and a spring detent adjustably secured to the first named plate and adapted to engage with the teeth of the cutter for holding the same in adjusted positions when the cutter is rotated to bring the several teeth into grinding positions.

5. A fixture for holding a cutter while being ground, comprising a plate for engagement with the bed of a grinding machine and having a pair of substantially parallel grooves, a second plate positioned above the first plate and having a pair of grooves disposed oppositely from the grooves in the first named plate, pins of various diameters adapted to engage with the oppositely disposed grooves in said plates, said pins being freely removable and interchange for varying the pitch of the upper plate with respect to the lower plate, a screw positioned between the pairs of oppositely disposed grooves and engaging with said plates for fastening them in adjusted positions, a hub fixed to the top plate, the upper surface of the hub being at an angle to the upper surface of the plate to provide for the desired clearance when grinding the sides of the teeth of the cutter, means for holding the cutter in rotatable position on the hub, and means for holding the cutter in adjusted positions for presenting the teeth to the grinding wheel.

ARTHUR RINGZELLI.